United States Patent
Chen et al.

(10) Patent No.: US 10,872,201 B1
(45) Date of Patent: Dec. 22, 2020

(54) GENERATION AND PRESENTATION OF ELECTRONIC BOOKS FOR CONSUMPTION IN SKIM MODE

(71) Applicant: AMAZON TECHNOLOGIES, INC., Seattle, WA (US)

(72) Inventors: Hong Chen, Seattle, WA (US); Michael Patrick Bacus, Seattle, WA (US); Rudy Darmawan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 372 days.

(21) Appl. No.: 15/383,508

(22) Filed: Dec. 19, 2016

Related U.S. Application Data

(63) Continuation of application No. 13/826,863, filed on Mar. 14, 2013, now Pat. No. 9,536,437.

(51) Int. Cl.
*G06F 40/197* (2020.01)
*G09G 5/391* (2006.01)
*G06F 40/106* (2020.01)
*G06F 40/134* (2020.01)
*G06F 40/279* (2020.01)

(52) U.S. Cl.
CPC .......... *G06F 40/197* (2020.01); *G06F 40/106* (2020.01); *G06F 40/134* (2020.01); *G06F 40/279* (2020.01); *G09G 5/391* (2013.01); *G09G 2380/14* (2013.01)

(58) Field of Classification Search
CPC .................................................... G06F 17/2288
USPC ............................................................ 434/317
See application file for complete search history.

(56) References Cited

U.S. PATENT DOCUMENTS

| | | |
|---|---|---|
| 5,558,520 A | 9/1996 | Werzberger |
| 2007/0168413 A1* | 7/2007 | Barletta ............... G06F 3/04883 709/203 |
| 2010/0216108 A1* | 8/2010 | Cooperman ........... G09B 5/062 434/317 |
| 2014/0038154 A1* | 2/2014 | Brownlow ............... G09B 5/06 434/317 |

* cited by examiner

*Primary Examiner* — Kesha Frisby
(74) *Attorney, Agent, or Firm* — Lowenstein Sandler LLP

(57) ABSTRACT

Providing an electronic document for consumption in a first mode of operation wherein a prominent component of the content of the electronic document is presented at a first resolution. In a second mode of operation, a modified version of the prominent component having a lower resolution than the first resolution is generated.

19 Claims, 7 Drawing Sheets

Ode on a Grecian Urn ~_202    200

*by John Keats* ~_204

Thou still unravish'd bride of quietness,
    Thou foster-child of silence and slow time,
Sylvan historian, who canst thus express
    A flowery tale more sweetly than our rhyme:    206
What leaf-fring'd legend haunts about thy shape
    Of deities or mortals, or of both,
In Tempe or the dales of Arcady?
    What men or gods are these? What maidens loth?
What mad pursuit? What struggle to escape?
    What pipes and timbrels? What wild ecstasy?

...

O Attic shape! Fair attitude! with brede
    Of marble men and maidens overwrought,
With forest branches and the trodden weed;
    Thou, silent form, dost tease us out of thought
As doth eternity: Cold Pastoral!    206
    When old age shall this generation waste,
Thou shalt remain, in midst of other woe
    Than ours, a friend to man, to whom thou say'st,
"Beauty is truth, truth beauty,—that is all
    Ye know on earth, and all ye need to know." ~_208

| Date Written | May, 1819 |
| --- | --- |
| Date Published | January, 1820 |
| Nation of Origin | England |
| Style | Ode |

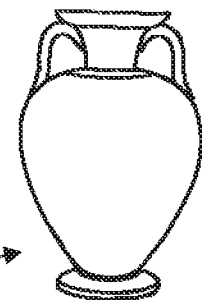

Ode on a Grecian Urn
*by John Keats*
"Beauty is truth, truth beauty,—that is all
   Ye know on earth, and all ye need to know."
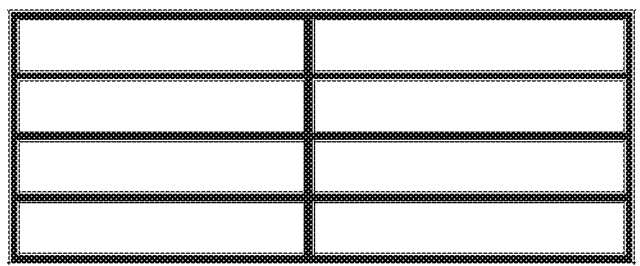 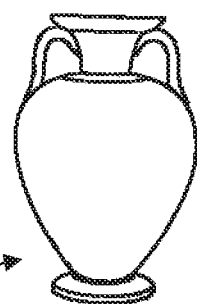
-217-
*Fig. 3*

Fig. 5
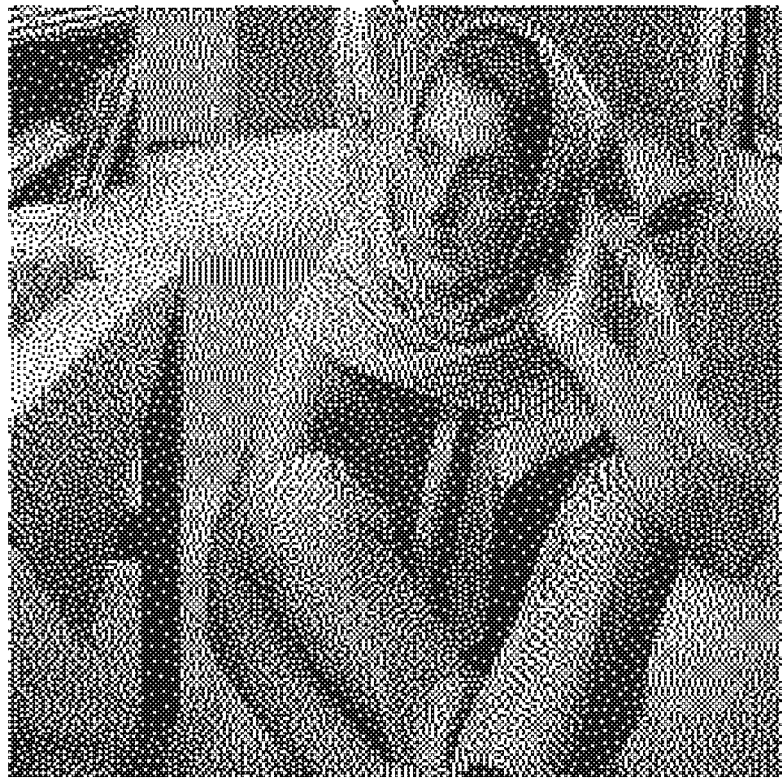

US 10,872,201 B1

GENERATION AND PRESENTATION OF ELECTRONIC BOOKS FOR CONSUMPTION IN SKIM MODE

CROSS-REFERENCE TO RELATED APPLICATION

This application is a continuation of U.S. patent application Ser. No. 13/826,863 filed on Mar. 14, 2013, titled "Generation and Presentation of Electronic Books for Consumption in Skim Mode," the entirety of which is hereby incorporated herein by reference.

BACKGROUND

As the use of computers and computer-based networks continues to expand, content providers are preparing and distributing more and more content in electronic form. This content includes printed media such as books, magazines, newspapers, newsletters, manuals, guides, references, articles, reports, documents, etc., that may be transformed from print into electronic form, e.g., as an "electronic book" or "e-book," through the use of a scanning device or other available means. A page image rendered to a user in electronic form allows the user to see the page of content as it would appear in print.

A reader may wish to partially consume, or "skim," content for a variety of reasons. The reader may wish to quickly locate a particular passage, or the reader may wish to quickly peruse the content to aid in a purchasing decision. With printed media, a reader may simply flip through pages to visually locate sought-after content or to quickly peruse the printed media. With an electronic book or other electronic media, on the other hand, a reader may not be able to skim through the contents as easily or quickly. Unless the reader knows a particular keyword or search phrase, the reader may not be able to use an electronic reader's search function to locate a particular excerpt of an electronic book. Additionally, the reader's ability to quickly advance through an electronic book with an electronic reader may be limited by the electronic reader's inability to render content quickly enough.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 2 illustrates an example portion of an electronic book with prominent and non-prominent components rendered, in accordance with various embodiments.

FIG. 3 illustrates the example portion of FIG. 2 as it may be rendered in skim mode by an electronic reader configured with applicable portions of the present disclosure, in accordance with various embodiments.

FIG. 5 illustrates an example photograph before and after being modified, in accordance with various embodiments.

DETAILED DESCRIPTION

Techniques described herein provide for enabling a reader to skim through an electronic book. In various embodiments, the electronic book may be stored in memory of an electronic reader. In various embodiments, storing may include storing prominent components and non-prominent components of the electronic book. In various embodiments, the electronic reader may monitor for an instruction to transition between a skim mode of operation and a normal mode of operation. In various embodiments, in response to detecting an instruction from the reader to enter the skim mode of operation, the electronic reader may be placed in the skim mode of operation. In various embodiments, while in the skim mode of operation, the prominent components of the electronic book may be filtered from the non-prominent components and presented, and presentation of the non-prominent components of the electronic book may be suppressed.

In various embodiments, a modified version of the first of the prominent components may be rendered in lieu of the first of the prominent components, wherein rendering the modified version of the first prominent component utilizes fewer computing resources or requires less time than rendering the first prominent component. In various embodiments, the first prominent component includes a picture having a first resolution, and the modified version of the first prominent component includes a version of the picture having a second resolution that is lower than the first resolution. In various embodiments, the first prominent component includes a table with text, and the modified version of the first prominent component includes a version of the table rendered without the text.

In various embodiments, a subset of the prominent components, or modified versions of the prominent components, that are disposed within a predetermined length of a point in the electronic book may be rendered in a buffer.

In various embodiments, the detecting includes detecting that a touch screen has been touched in a predefined manner. In various embodiments, the detecting includes detecting that a touch screen has been swiped at a speed that is greater or less than a predetermined speed.

In various embodiments, the electronic reader may be placed in the normal mode of operation responsive to a determination that the reader has ceased reading the electronic book in the skim mode. In various embodiments, the electronic reader may be placed in the normal mode of operation responsive to detecting a touch screen has been touched in a predefined manner.

In various embodiments, the prominent component includes one or more of a picture, a table and/or text in a particular font.

Figure 1:
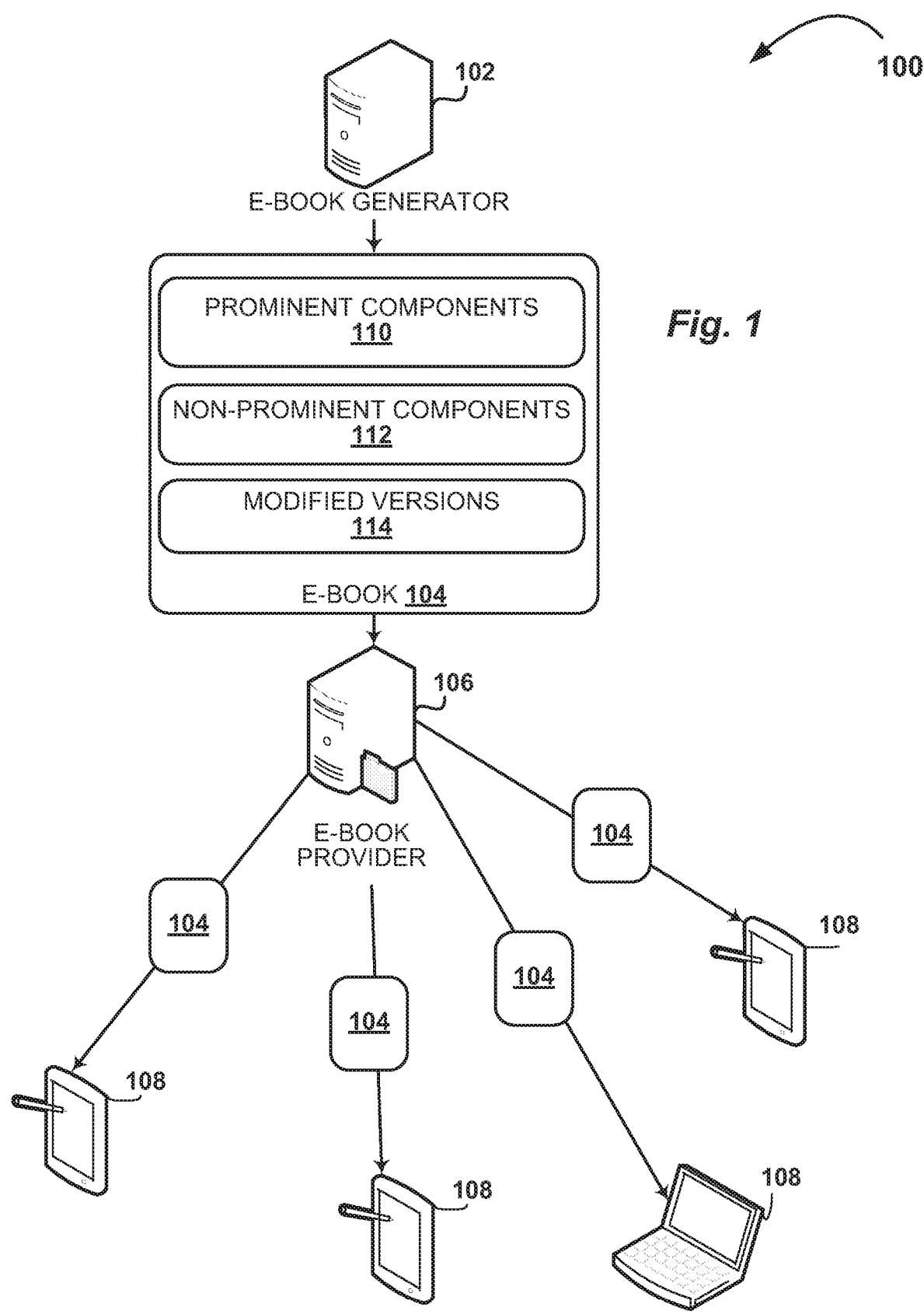
FIG. 1 depicts an example of how an electronic book generator may generate, and an electronic book provider may distribute, electronic books for use at a number of electronic readers, in accordance with various embodiments.

FIG. 1 illustrates an example environment 100 for generation and distribution of electronic books, also referred to as "e-books." An electronic book generator 102 may be configured with applicable portions of the present disclosure to generate an electronic book 104 configured to enable partial consumption, e.g., in a "skim" mode. Electronic book generator 102 may be configured to provide electronic book 104 to an electronic book provider 106.

In various embodiments, electronic book provider 106 may be configured to distribute copies of electronic book 104 to one or more electronic readers 108, one or more of which may be configured with applicable portions of the present disclosure. For example, electronic book provider 106 may provide, over a computer network (not shown), a webpage or other interface operable to browse, exchange, search for, rent, purchase, and/or download electronic books 104. Although depicted separately in FIG. 1, in some embodiments, electronic book generator 102 and electronic book provider 106 may be implemented on a single computing system, or together across multiple computing systems (e.g., on a server farm).

In various embodiments, electronic book 104 may include various components, including but not limited to text, images, diagrams, figures, maps, tables, source code examples, quoted excerpts, sections, chapters, headings, titles, page numbers, and so forth. Some of these components, such as images, may be more conspicuous, or "prominent," than other components, such as body text.

When a reader skims through printed media, e.g., by flipping quickly through the pages, the reader may only see or take notice of prominent components, and may not have sufficient time to see or take notice of non-prominent components such as body text. But seeing only the prominent components may be sufficient for the reader's purposes (e.g., determining whether to buy a book, locating a particular content in a book).

Accordingly, in various embodiments, electronic book 104 may include prominent components 110 and non-prominent components 112. When electronic book 104 is partially consumed, e.g., using electronic reader 108 in a "skim" mode, prominent components 110 may be filtered from non-prominent components and presented (e.g., rendered). Rendering of non-prominent components 112, on the other hand, may be suppressed. Suppressing rendition of non-prominent components 112 may free computing resources of electronic reader 108 to more quickly render prominent components 110, allowing a reader to skim through electronic book 104 more quickly. On the other hand, when electronic book 104 is completely consumed, e.g., using electronic reader 108 in a "normal" mode, both prominent and non-prominent components may be presented.

In various embodiments, electronic book 104 may also include "modified" versions 114 of some or all prominent components 110. Rendering modified versions 114 of prominent components 110 may utilize fewer computing resources of electronic reader 108 and/or require less time than rendering prominent components 110. For example, if a prominent component 110 is an image having a particular resolution, a modified version 114 of the prominent component 110 may be a version of the image having a lower resolution. As another non-limiting example, a modified version 114 of a table with text may be a line drawing of the table without text, or with less text than was in the original table. In various embodiments, links may be generated between original prominent components and their corresponding modified versions. In various embodiments, when electronic book 104 is consumed in skim mode (e.g., using electronic reader 108), modified versions 114 of prominent components 110 may be rendered in lieu of corresponding prominent components 110.

FIGS. 2 and 3 depict an example of how a portion 200 of an electronic book (e.g., 104) may be rendered when consumed in a normal mode of consumption and a skim mode of consumption, respectively. As seen in FIG. 2, portion 200 corresponds to a page of a printed book, and may include a title 202, a subheading 204 (in this instance indicating an author), body text 206, emphasized text 208, a table 210, an image 212 and a page number 214. These components are presented merely for illustrative purposes, and are not meant to be limiting.

Some of the components of portion 200 may be prominent. For example, all or some of title 202, subheading 204, emphasized text 208, table 210, image 212 and/or page number 214 may be characterized, e.g., by electronic book generator 102, and recognized, e.g., by electronic reader 108, as prominent. As noted above, these types of components may be of the type that would be visible to a reader skimming through a printed version of electronic book 104.

In FIG. 3, portion 200 is shown as it may be depicted when consumed, e.g., using electronic reader 108, in a skim mode. In this example, only prominent components are presented; non-prominent components such as body text 206 are not rendered. Additionally, a modified version of table 210 without text is also rendered. In other embodiments, at least some, but less than all text of table 210, may be rendered.

Figure 4:
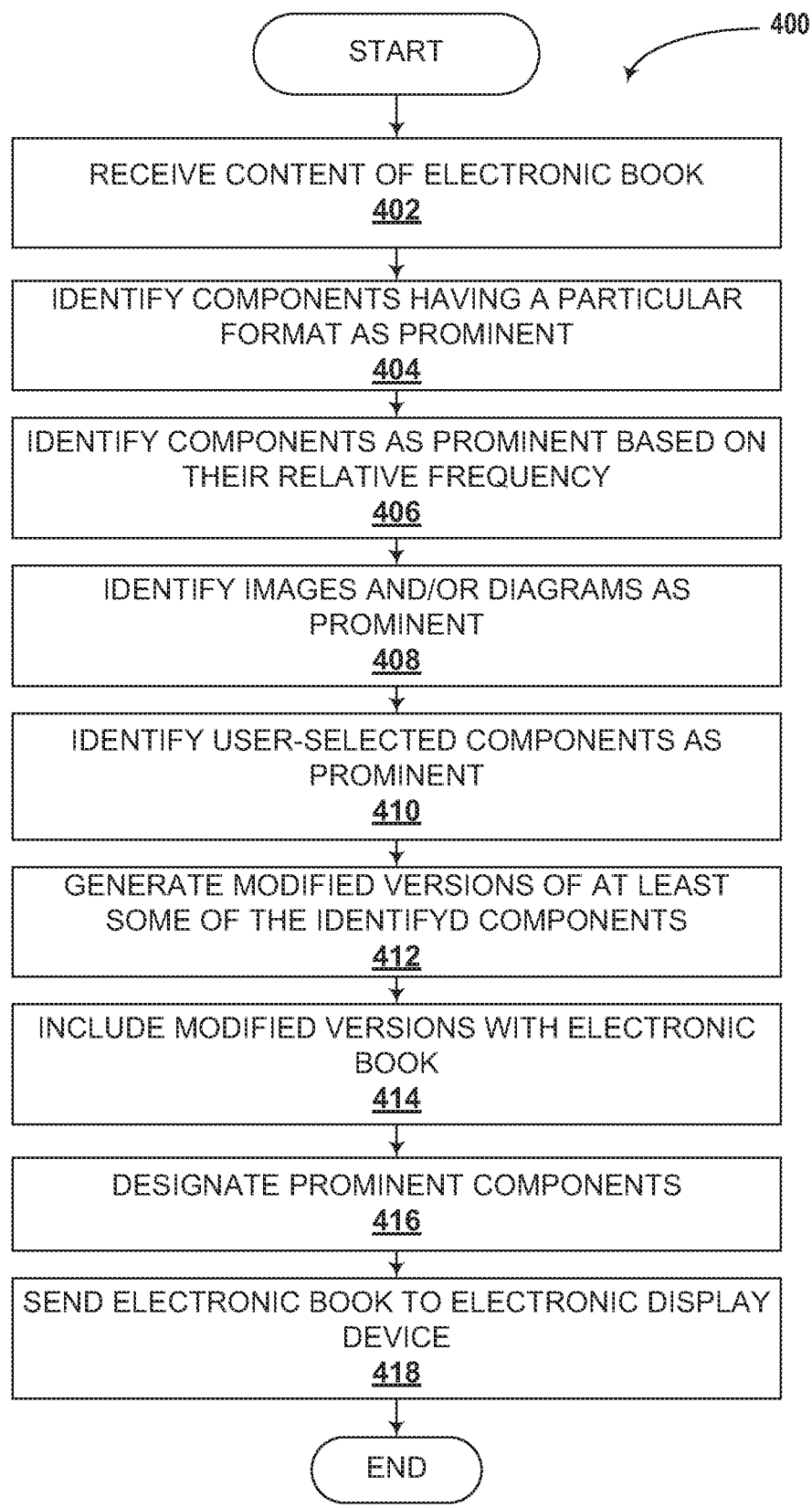
FIG. 4 illustrates a process flow diagram for generating an electronic book configured to be consumed in a skim mode, in accordance with various embodiments.

FIG. 4 is a process flow diagram illustrating an example process 400 for generating an electronic book 104, in accordance with various embodiments. Process 400 may be implemented by an electronic book-generating and/or provider computer or computers, such as electronic book generator 102 or electronic book provider 106 in FIG. 1, in accordance with various embodiments. In some embodiments, electronic reader 108 may perform selected aspects of process 400, e.g., where a user downloads a "legacy" electronic book that is not configured for consumption in a skimming mode.

The process 400 may begin at block 402, where content of electronic book 104 may be received, e.g., by electronic book generator 102. At block 404, components or portions of electronic book 104 having a particular format, e.g., such as text that would be at least somewhat visible during skimming, may be automatically or manually identified, e.g., by electronic book generator 102, as prominent. In various embodiments, text that is larger than surrounding text, such as a title (e.g., 202 in FIGS. 2-3) or a subheading (e.g., 204 in FIGS. 2-3), may be automatically or manually identified as prominent. In various embodiments, text that is emphasized (e.g., bolded, italicized, underlined, etc.) relative to other text, such as emphasized text 208 in FIGS. 2-3, may be automatically or manually identified as prominent. In various embodiments, margin text or other text that may be useful during skimming, such as page number 214 in FIGS. 2-3, may be identified as prominent. Other formats may be basis for identification as prominent, depending on the nature or subject matter of the electronic book, the published language, a choice of an author or publisher, and so forth. For example, text organized into a table may be identified as prominent.

In addition to or instead of the operation at block 404, at block 406, components or portions of electronic book 104 may be identified as prominent or non-prominent based on their relative frequency, e.g., compared to other components of electronic book 104. For example, components occurring at a frequency in electronic book 104 that is less than a frequency of occurrence of other components, or less than a threshold frequency (e.g., 5%, 10%, 15%, etc.), may be identified as prominent. As a more specific example, assume electronic book generator 102 determines that a first type of text having a particular font and indentation occurs approximately once every three pages, and typically has less than a particular number of words or characters. An example of such text may be a title or subheading (e.g., 202 or 204 in FIGS. 2-3). Assume electronic book generator 102 also determines that a second type of text having a smaller font, such as body text, occurs more frequently. Based on these determined frequencies, in various embodiments, electronic book generator 102 may automatically identify the first type (e.g., titles) as prominent and the second as non-prominent. As another non-limiting example, particular words that are used more or less frequently than others (e.g., catch phrases) may also be identified as prominent and/or non-prominent.

In addition to or instead of the operations at block 404-406, at block 408, images, diagrams, figures, maps, and other conspicuous graphical components such as tables may be identified, e.g., by electronic book generator 102, as prominent. In various embodiments, graphical components may be selectively identified as prominent based on whether they satisfy one or more predetermined criterion. For example, a small diagram appearing on a page that otherwise only contains body text may be identified as prominent. On the other hand, a similar small diagram that appears on the same page as several other diagrams or images may be less conspicuous than the other diagrams or images. In such case, the small diagram may not necessarily be identified as prominent.

In addition to or instead of the operations at block 404-408, at block 410, user-selected components or portions may be identified as prominent. For instance, during generation of electronic book 104, a user (e.g., an author, editor or publisher) may manually identify components within the electronic book, e.g., using an input device such as a mouse and/or keyboard at electronic book generator 102, to be identified as prominent. In this way, users may be able to identify (e.g., annotate, highlight, add note, bookmark, etc.) any components as prominent, regardless of format or frequency. For example, a user may identify as prominent what she subjectively believes would be an interesting plot point, such as the death of a major character, so that end users' attention may be drawn to this plot point when skimming electronic book 104. As another example, a user may search for particular text, e.g., if they remember a key word of a particular page, and other text immediately associated with that text may be selected for identification as prominent. For instance, the user may search for "To be or not to be," and dialogue immediately before and/or after may also be selected to be prominent. An end user skimming electronic book 104 may be presented with the searched-for text along with at least some contextual dialogue.

At block 412, modified versions of at least some of the components identified as prominent at blocks 404-410 may be generated, e.g., by electronic book generator 102. As noted above, a modified version of a component may require less computing resources and/or time to render than its corresponding prominent component. Modified versions of components may be generated in various ways, depending on the nature of the component. For instance, a picture having a particular resolution may be downsampled to a lower resolution. An example of this is shown in FIG. 5, in which an original image 550 is downsampled to a low resolution modified version 552. Modified version 552 may be rendered when the electronic book is in skim mode, in lieu of original image 550. Components such as pictures may also be modified in other ways as well, including but not limited to gray level reduction, simplification of vectorized graphic instructions, use of wavelets (e.g., for pattern extraction), slowing or stopping of animation (if it exists in electronic book 104), cropping, scaling, compression, and so forth.

In various embodiments, the modified components may be included with electronic book 104 at block 414, e.g., with links to the prominent components they will replace when electronic book 104 is consumed in skim mode. For example, a link may be provided between original image 550 (or a portion of electronic book 104 that contains original image 550) and modified version 552 in FIG. 5.

In various embodiments, at block 416, components identified as prominent at blocks 404-410 may be designated (e.g., labeled) as prominent. For example, if an electronic book is generated using a markup language such as the HyperText Markup Language ("HTML") or the eXtensible Markup Language ("XML"), prominent components may be "tagged" as prominent, e.g., by inserting a <prominent> tag before and/or after the component. The resulting electronic book may then be sent to an electronic display device (e.g., electronic reader 108) at block 418. For example, electronic book generator 102 may provide electronic book 104 to electronic book provider 106 for distribution, or may send electronic book 104 to an electronic reader 108.

Figure 6:
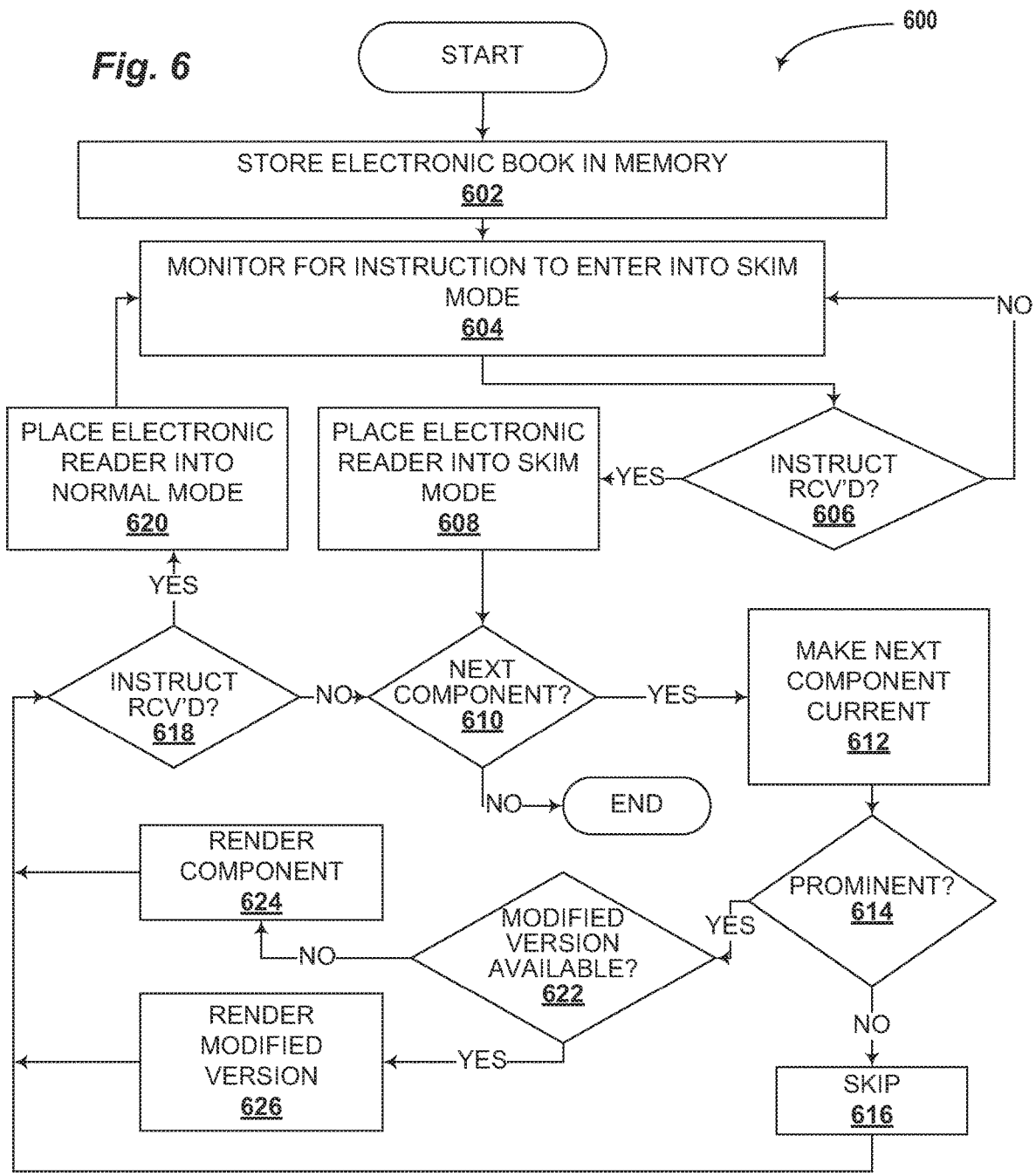
FIG. 6 illustrates a process flow diagram for presenting an electronic book for partial consumption in skim mode, in accordance with various embodiments.

FIG. 6 is a process flow diagram illustrating an example process 600 for consuming electronic book 104, in accordance with various embodiments. Process 600 may be implemented by any computing system or device configured to present, for consumption by a reader, electronic book 104. For example, in FIG. 1, electronic readers 108 may include tablet computing devices configured specifically for consumption of electronic books, as well as a laptop computer operating an application configured to provide electronic book 104 for consumption. However, this is not meant to be limiting, and process 600 may be implemented on any device configured to enable consumption of electronic book 104, including but not limited to desktop computers, mobile phones (also referred to as "smart phones"), televisions, set top boxes, and so forth.

At block 602, electronic book 104 may be stored in memory of electronic reader 108. For example, a reader may operate electronic reader 108 to purchase and download electronic book 104 from a website or an application/electronic bookstore.

At block 604, while the reader is consuming electronic book 104, electronic reader 108 may monitor for an instruction from the reader to enter into a skim mode. For instance, electronic reader 108 may monitor to detect when an associated touch screen has been touched in a predefined manner. In various embodiments, various types of touches, gestures and so forth may be interpreted as instructions to transition into skim mode. For instance, a touch screen being swiped at a speed that is greater or less than a predetermined speed may indicate that the reader wishes to partially and/or quickly consume electronic book 104, and thus may cause electronic reader 108 to be placed into skim mode. In some embodiments, a reader simultaneously touching the touch screen with two fingers and/or swiping those two fingers from one side of the touch screen to the other may be interpreted as an instruction to place electronic reader 108 into skim mode.

If, at block 606 an instruction to place electronic reader 108 into skim mode is received, then process 600 may proceed to block 608, where electronic reader 108 and/or an electronic reading application executing thereon may be placed into a skim mode.

At block 610, it may be determined, e.g., by electronic reader 108, whether there is a next component. If the answer is no, then the reader may have skimmed to the end of electronic book 104, and process 600 may end. However, if the answer at block 610 is yes, then at block 612, the next component may be made the current component, e.g., by shifting a "current" pointer to point to the next component.

At block 614, it may be determined, e.g., by electronic reader 108, whether the current component is labeled or otherwise designated as prominent. For instance, electronic reader 108 may search for a markup language tag <prominent> that tells electronic reader 108 that the current component is prominent.

If the answer at block 614 is no, then process 600 may proceed to block 616, in which rendering of the current component is suppressed. Process 600 may then proceed to 618, at which it may be determined, e.g., by electronic reader 108, whether an instruction to transition to a normal mode has been received. For instance, a reader may have ceased reading the electronic book in the skim mode, e.g., for more than a predetermined amount of time, which may trigger an instruction to enter into normal mode. As another example, the reader may utilize a predefined gesture (e.g., swiping a touch screen at a sufficiently slow speed, or two fingers stopping on the screen) that may be interpreted as an instruction to place electronic reader 108 into normal mode. As yet another example, a user may operate another component, such as a toggle switch rendered on a touch screen or mechanically operable on electronic reader 108, to switch from skim mode to normal mode (or vice versa in some embodiments).

If the answer at block 618 is yes, then at block 620, electronic reader 108 may be placed into normal mode, and process 600 may proceed back to block 604. While in normal mode, prominent and non-prominent components alike may be rendered, e.g., on a touch screen.

If the answer at block 618 is no, which may mean the reader is still skimming electronic book 104, then process 600 may proceed back to block 610.

Returning to block 614, if the answer is yes (the current component is prominent), then at block 622, it may be determined, e.g., by electronic reader 108, whether there is a modified version of the current component available. If the answer is no, then at block 624, the current component may be rendered, e.g., in its original form. If the answer at block 622 is yes, however, then at block 626, the modified version of the current component may be rendered in lieu of the current component, conserving computing resources and/or time. Either way, process 600 may then proceed to block 618.

In various embodiments, electronic reader 108 may be configured, upon opening of electronic book 104, to generate a list of prominent components and/or their modified versions. In various embodiments, electronic reader 108 may be configured to cache or otherwise pre-render content in a buffer (also referred to as a "render window"), e.g., to facilitate faster skimming. In some embodiments, electronic reader 108 may be configured to render, e.g., in a memory buffer, a subset of all prominent components and/or modified versions thereof in electronic book 104 that are disposed within a predetermined length from a particular point, e.g., as indicated by a pointer. For instance, if a reader skimming through an electronic book 104 is currently on page 155 (e.g., as indicated by a pointer), then electronic reader 108 may be configured to render prominent components and/or modified versions thereof on pages 150-160. That way, as the reader skims ahead, e.g., to page 157, prominent components and/or modified versions thereof that are disposed on page 157 may already be rendered when a window representative of what is currently displayed (e.g., by a touch screen, also referred to as a "display window") passes by. In this manner, the reader may experience little to no latency as the reader skims ahead (or backwards, as the case may be). In some embodiments, rather than the length being a number of pages, the length may be a distance (e.g., in inches, centimeters, lines, paragraphs, etc.).

In some embodiments, a skimming reader's current position in electronic book 104 may be tracked with a pointer to the display window. In various embodiments, display window may represent a first block of memory containing content to be displayed presently, and the render window may represent a second, larger block of memory of pre-rendered nearby components. When the reader moves his or her fingers along a touch screen, the display window pointer and display window may be moved accordingly. Movement of the display window in turn may cause movement of the render window, e.g., so that nearby prominent contents and/or modified versions thereof continue to be pre-rendered.

Although processes 400 and 600 are described as being separately implementable on electronic book generator 102 and electronic reader 108, respectively, this is not meant to be limiting. In some embodiments, both processes may be implemented on a single device. For instance, electronic reader 108 may be configured, e.g., on receipt of a "normal" electronic book that has not undergone the processing shown in FIG. 4, to perform some or all aspects of process 400 on its own. In this manner, electronic reader 108 may be equipped to facilitate skimming of legacy electronic books. Electronic reader 108 may not have sufficient computing resources or battery power to generate, on the fly, modified versions of various prominent features. Thus, in some cases, electronic reader 108 may simply render prominent features in their native form. Additionally or alternatively, electronic reader 108 may selectively suppress rendering of prominent components having a size or complexity that exceeds a threshold.

In another aspect, some existing applications for reading electronic books (e.g., PDF viewers) may enable thumbnail navigation, e.g., by rendering miniature versions of pages in a margin. A user may click on those pages to jump to a particular page. However, rendering miniature versions of the pages may be resource intensive and/or time consuming, particularly where those pages include a lot of images or tables. Moreover, as they are rendered in miniature, the reader may not be able to see the minute details of the miniature pages, such as body text. Accordingly, in various embodiments, electronic reader 108 may be configured to render thumbnails of pages of electronic book 104 in which prominent components (or modified versions thereof) are rendered, and rendering of non-prominent components is suppressed. In this manner, the processing power and/or time required to render page thumbnails may be reduced.

Figure 7:
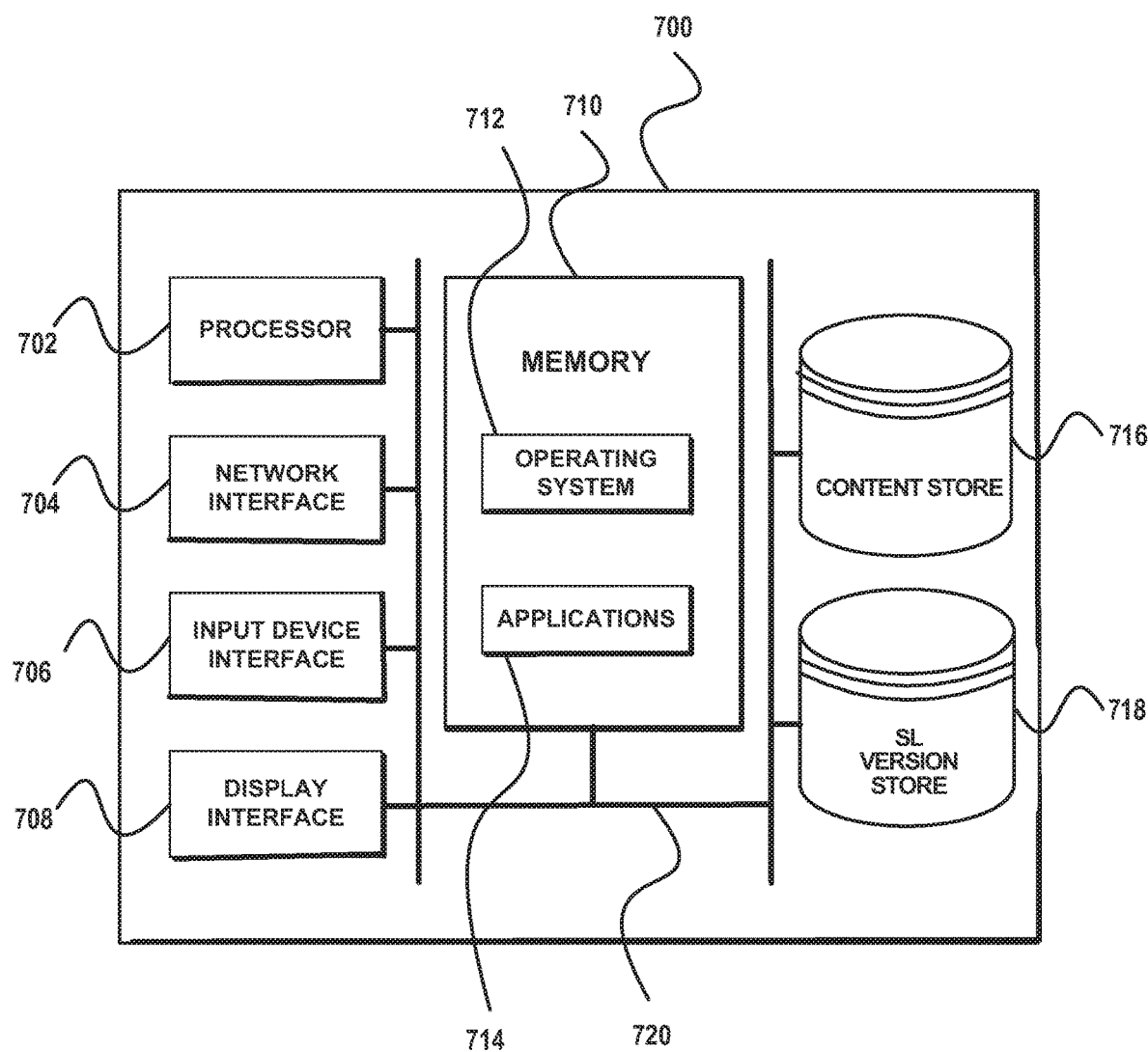
FIG. 7 illustrates an example computing environment in which embodiments described in the present disclosure may be implemented in accordance with various embodiments.

FIG. 7 illustrates an example environment (e.g., one or more computing devices) suitable for implementing various techniques described herein, in accordance with various embodiments.

The computing devices may include, but are not limited to, laptop or tablet computers, personal computers, workstations, mini- and mainframe computers, and the like. The computing devices may also include specially configured computers for generating and/or providing electronic books. For example, the environment may include an electronic book generator 102 or an electronic book provider 106 described above in reference to FIG. 1. The general architecture of a suitable computing device is described below in regard to FIG. 7. More particularly, FIG. 7 is a block diagram illustrating example components of a computing device 700 suitable for generating, providing and/or presenting an electronic book for consumption. However, the following description of the example components of a computing device 700 should be viewed as illustrative only and not construed as limiting in any manner.

With regard to FIG. 7, the example computing device 700 may include a processor 702 in communication with a variety of other components over a system bus 720. These other components may include, by way of example, a network interface 704, an input device interface 706, a display interface 708, and a memory 710. As appreciated by those skilled in the art, the network interface 704 enables the computing device 700 to communicate data, control signals, data requests, and other information with other resources including computers, data sources, storage devices, and the like, on a computer network such as the Internet (not shown). The network interface 704 may be configured to communicate via wired or wireless connections. As one skilled in the art will appreciate, the computing device 700 may provide/obtain an electronic book to/from another computer, such as electronic book provider 106 via the computer network.

The input device interface 706, sometimes also embodied as an input/output interface, enables the computing device 700 to obtain data input from a variety of devices including, but not limited to, a digital pen, a touch screen, a keyboard, a mouse, a scanner, and the like. In addition to the example components described above, a display interface 708 may be used for outputting display information to a computer user. Typically, the display information may be outputted by the display interface 708 via a display device (e.g., a CRT monitor, an LCD screen, a touch screen, a television, an integrated screen or sets of screens, etc.). Of course, while not shown, one skilled in the art will appreciate that a display device may be incorporated as an integral element within a computing device 700.

The processor 702 may be configured to operate in accordance with programming instructions stored in a memory 710. The memory 710 may generally comprise RAM, ROM, and/or other permanent memory. Thus, in addition to storage in read/write memory (RAM), programming instructions may also be embodied in read-only format, such as those found in ROM or other permanent memory. The memory 710 may typically store an operating system 712 for controlling the general operation of the computing device 700. The operating system may be a general purpose operating system such as a Microsoft Windows® operating system, a UNIX®. operating system, a Linux® operating system, or an operating system specifically written for and tailored to the computing device 700. Similarly, the memory 710 may also typically store user-executable applications 714, or programs, for conducting various functions on the computing device 700. For example, the applications 714 in memory 710 may be an electronic book generator, an electronic book provider or an electronic book reader, respectively configured according to components 102, 106, and 108 described above in reference to FIG. 1.

The computing device 700 optionally includes a content store 716, e.g., to store prominent components 110 and non-prominent components 112 of an electronic book 104, and a modified version store 718, e.g., to store modified versions 114 of some or all of prominent components 110.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein, limited only by the claims.

What is claimed is:

1. A method comprising:
   receiving, by a processor device, content of an electronic book;
   identifying, by the processor device, a first portion of the content as a prominent component comprising a picture having a first resolution;
   generating, by the processor device, a modified version of the picture having a lower resolution than the first resolution;
   identifying a second portion of the content comprising one or more non-prominent components; and
   causing, by the processor device, a display of the electronic book comprising the modified version of the picture having the lower resolution, wherein the second portion of the electronic book comprising the one or more non-prominent components is suppressed from the display of the electronic book.

2. The method of claim 1, further comprising designating, by the processor device, the first portion with a first tag indicating the first portion is the prominent component.

3. The method of claim 1, wherein identifying the first portion of the content as the prominent component further comprises:
   determining a first format of text associated with the first portion is different than a second format of text associated with a second portion of the content.

4. The method of claim 1, wherein identifying the first portion of the content as the prominent component further comprises:
   determining a first frequency of occurrence of the first portion of the content in the electronic book is less than a second frequency of occurrence of a second portion of the content in the electronic book.

5. The method of claim 1, wherein identifying the first portion of the content as the prominent component further comprises identifying the first portion comprises the picture.

6. The method of claim 1, wherein identifying the first portion of the content as the prominent component further comprises identifying the first portion comprises a table.

7. The method of claim 1, further comprising including, by the processor device, the modified version of the first portion with the electronic book.

8. The method of claim 1, further comprising including in the electronic book, by the processor device, a link associating the first portion of the content and the modified version of the first portion of the content.

9. The method of claim 1, wherein identifying the first portion of the content as the prominent component further comprises:
   determining that a first number of characters in the first portion of the content in the electronic book is less than a second number of characters of a second portion of the content in the electronic book.

10. A system comprising:
    a memory to store instructions; and
    a processing device operatively coupled to the memory, the processing device to execute the instructions to:

identify a first portion of content of an electronic document as a prominent component comprising a picture having a first resolution;

generate a modified version of the picture having a lower resolution than the first resolution;

identify a second portion of the content comprising one or more non-prominent components; and cause, by the processor device, a display of the electronic document comprising the modified version of the picture having the lower resolution, wherein the second portion of the electronic book comprising the one or more non-prominent components is suppressed from the display of the electronic book.

11. The system of claim 10, the processing device to:

designate, in the electronic document, the first portion with a first tag to indicate the first portion is the prominent component.

12. The system of claim 10, wherein the processing device to include the modified version of the first portion with the electronic book.

13. The system of claim 10, wherein the processing device to include, in the electronic book, a link associating the first portion of the content and the modified version of the first portion of the content.

14. The system of claim 10, wherein the first portion of the content comprises a table.

15. The system of claim 10, wherein the first portion comprises a first format of text that is different than a second format of text associated with the non-prominent portion of the content.

16. The system of claim 10, wherein a first frequency of occurrence of the first portion of the content in the electronic book is less than a second frequency of occurrence of the non-prominent portion of the content in the electronic book.

17. The system of claim 10, wherein a first number of characters in the first portion of the content in the electronic book is less than a second number of characters of the non-prominent portion of the content in the electronic book.

18. An electronic reader comprising:

a memory to store instructions; and a processing device operatively coupled to the memory, the processing device to execute the instructions to:

detect an instruction to transition from a first mode of operation to a second mode of operation;

identify, in the second mode of operation, a first portion of content of an electronic book as a prominent component comprising a picture having a first resolution;

identify a modified version of the picture having a lower resolution than the first resolution;

identify a second portion of the content comprising one or more non-prominent components; and render a display of the electronic book comprising the modified version of the picture having the lower resolution, wherein the second portion of the electronic book comprising the one or more non-prominent components is suppressed from the display of the electronic book.

19. The electronic reader of claim 18, the processing device to include, in the electronic book, a link associating the first portion of the content and the modified version of the first portion of the content.

\* \* \* \* \*